United States Patent [19]

Chablaix et al.

[11] Patent Number: 5,306,518
[45] Date of Patent: Apr. 26, 1994

[54] PREPARATION OF FLAVORANTS FROM OIL SEEDS

[75] Inventors: René E. Chablaix, Lausanne; Daniel Hug, St-Legier, both of Switzerland

[73] Assignee: Nestec S.A., Vevey, Switzerland

[21] Appl. No.: 486

[22] Filed: Jan. 5, 1993

[30] Foreign Application Priority Data

Feb. 26, 1992 [CH] Switzerland .................. 596/92

[51] Int. Cl.5 .................. A23L 1/36; A23L 1/221
[52] U.S. Cl. .................. 426/632; 426/459; 426/460; 426/461; 426/466; 426/518; 426/633; 426/634; 426/650
[58] Field of Search .............. 426/632, 633, 634, 650, 426/459, 460, 461, 466, 518

[56] References Cited

U.S. PATENT DOCUMENTS 3,700,462 10/1972 Stefanucci et al. ............ 99/68
4,477,482 10/1984 Avera .................. 426/650

FOREIGN PATENT DOCUMENTS 1318539 3/1962 France .
2656200 6/1991 France .
WO86/03945 7/1986 World Int. Prop. O. .

OTHER PUBLICATIONS

Willich et al. 1951, "Roasting, Cooling, Blanching, and Picking of Peanuts", Food Technology, pp. 71–73, Feb. 1952.
Derwent Abstract of JP A 59 169 479 (1984).
European Search Report for CH 59692.

*Primary Examiner*—Helen Pratt
*Attorney, Agent, or Firm*—Vogt & O'Donnell

[57] ABSTRACT

A flavorant product is prepared by heat-treating a first quantity of oilseeds for from 1 minute to 20 minutes at a temperature of from 220° C. to 320° C. and heat-treating a second quantity of oilseeds for from 1 minute to 40 minutes at a temperature of from 140° C. to 180° C. and then grinding and mixing the first and second heat-treated oilseeds.

14 Claims, No Drawings

PREPARATION OF FLAVORANTS FROM OIL SEEDS

BACKGROUND OF THE INVENTION

This invention relates to a flavouring product based on ground and roasted oilseeds and to a process for the production of this starting material.

There are various known processes for the production of pastes based on ground oilseeds, such as almonds or hazelnuts for example, which are intended for use in the preparation of confectionery products.

Thus, French Patent No. 1 318 539 (H. Schoppe & Schultz) describes a process in which a paste based on walnuts, almonds, hazelnuts or the like, more particularly grilled and/or ungrilled, sugar and water is prepared and then dried in a drying tower to form a powder which may be incorporated, for example, in a whipped cream, in double creams or in praline-containing mixtures.

Similarly, PCT application No. WO 86/03945 (Franz Haas Waffelmaschinen Industriegesellschaft m.b.H) describes a process in which walnuts, almonds, hazelnuts or the like are compressed so that they are all of the same thickness, subsequently roasted together in the presence of a flavour support, such as a sugar, so that they have a uniform degree of roasting and are then converted into a paste for the preparation of creams.

SUMMARY OF THE INVENTION

The problem addressed by the present invention was to provide a flavouring product based on roasted and ground oilseeds of which the flavour note and intensity could be adjusted in a precise and easy manner.

To this end, the flavouring product according to the invention comprises a mixture of heat-treated and ground oilseeds, herein after referred to as roasted and ground oil-seeds A and toasted and ground oilseeds B, and as shown below, A and B need not be different.

Similarly, in the process according to the invention from the production of a flavouring product, a quantity of oilseeds A are roasted, and a quantity of oilseeds B are toasted, and the roasted oilseeds A and the toasted oilseeds B are ground and are then mixed.

It has been found that it is thus possible easily, precisely and reproducibly to adjust the flavour note and intensity, more particularly the note and intensity characteristic of a roasted seed flavour which a product of this type can have.

DETAILED DESCRIPTION OF THE INVENTION

According to the invention, the above-mentioned oilseeds A and B may be, for example, hazelnuts, almonds, pistachio nuts, peanuts and/or pine seeds and even walnuts, para nuts and/or cashew nuts.

The roasted oilseeds A and the toasted oilseeds B may advantageously be characterized by their colour, the roasted seeds having a darker colour, for example brown, than the toasted seeds which have a lighter colour, for example beige. This colour may be defined by its components L, a and b which may be determined in known manner, for example with a suitable commercially available colorimeter or chromameter.

Thus, in one preferred embodiment of the flavouring product and the process according to the invention where the oilseeds A and B are hazelnuts, the roasted hazelnuts A preferably have colour components L of 20 to 30, a of 0.5 to 4 and b of 0.5 to 6 while the toasted hazelnuts B preferably have colour components L of 40 to 60, a of 5 to 12 and b of 20 to 30.

The oilseeds A are preferably roasted for 1 to 20 minutes at 220° to 320° C. and the oilseeds B are toasted for 1 to 40 minutes at 140° to 180° C.

This roasting step and/or this toasting step may be carried out, for example, in a roaster having a surface heated by gas, electricity or steam, or in an infrared oven, a microwave oven or a hot-air oven.

The roasted oil-seeds and the toasted oilseeds may then be ground, for example, in a hammer mill, a cutter mill, a stone mill, a ball mill and/or in a cylinder refiner, depending on the desired degree of fineness. In a preferred embodiment, the oilseeds are first ground to 0.5–2 mm grains and the grains obtained are then ground to 20–40$\mu$ particles.

The roasted and ground hazelnuts A and the toasted and ground hazelnuts B may be mixed in a ratio by weight of from 20:80 to 80:20.

The flavouring product according to the invention is preferably intended for the preparation of a confectionery paste or cream to which it enables a flavour of predetermined intensity having a note characteristic of roasted seeds, more particularly roasted hazelnuts, to be imparted with remarkable reproducibility.

EXAMPLES

The product and the process according to the invention are illustrated by the following Examples in which percentages are by weight.

EXAMPLE I

A) A gas roaster heated to a temperature of from 240° to 250° C. is charged with 35.5 kg natural Piedmont hazelnuts 13 to 15 mm in diameter. The nuts are thus roasted for 6.5 minutes.

The nuts are then brushed clean, coarsely ground in a cutter mill and then finely ground in a stone mill. B) A steam roaster heated to a temperature of from 145° to 155° C. is charged with 100 kg natural Piedmont hazelnuts 13 to 15 mm in diameter. The hazelnuts are thus toasted for 8.5 minutes.

They are then brushed clean, coarsely ground in a cutter mill and then finely ground in a stone mill.

Eight samples of the roasted and ground hazelnuts A and eight samples of the toasted and ground hazelnuts B are taken. The components L, a, b of the colour of each of these samples is then determined with a MINOLTA chromameter equipped with a CR-310 measuring probe.

For each determination, the sample is placed in a receptacle closed by a plate of glass. The receptacle is then placed under an incident light beam corresponding to the light of day. The light reflected by the sample is detected through three colour filters. The instrument displays the mean value of three successive measurements performed automatically (three flashes). The result is expressed in components L, a, b.

The results are set out in Tables A and B below.

TABLE A

| Sample No. | ROASTED HAZELNUTS | | |
|---|---|---|---|
| | L | a | b |
| 1 | 22.34 | 2.21 | 2.62 |
| 2 | 24.90 | 1.65 | 3.26 |
| 3 | 22.14 | 2.27 | 2.53 |
| 4 | 22.24 | 2.28 | 2.66 |

TABLE A-continued

| Sample No. | ROASTED HAZELNUTS | | |
|---|---|---|---|
| | L | a | b |
| 5 | 22.30 | 2.20 | 2.70 |
| 6 | 24.97 | 1.90 | 3.31 |
| 7 | 24.82 | 1.53 | 3.10 |
| 8 | 24.67 | 1.69 | 3.16 |
| AVERAGE | 23.55 | 1.97 | 2.92 |
| Standard deviation | 1.30 | 0.29 | 0.30 |

TABLE B

| Sample No. | TOASTED HAZELNUTS | | |
|---|---|---|---|
| | L | a | b |
| 1 | 49.74 | 8.20 | 25.83 |
| 2 | 48.84 | 8.36 | 26.17 |
| 3 | 49.82 | 8.12 | 26.13 |
| 4 | 50.31 | 8.22 | 26.42 |
| 5 | 48.06 | 8.74 | 26.02 |
| 6 | 49.90 | 8.00 | 26.52 |
| 7 | 49.07 | 8.38 | 26.31 |
| 8 | 48.25 | 8.44 | 26.00 |
| AVERAGE | 49.25 | 8.31 | 26.18 |
| Standard deviation | 0.77 | 0.21 | 0.22 |

EXAMPLE II

Three flavouring products are prepared by mixing the roasted and ground hazelnuts A of Example I and the toasted and ground hazelnuts B of Example I in three different ratios by weight, namely:

i) 50:50
ii) 60:40
iii) 70:30.

Mixture i) is distinguished by its fineness. Mixture ii) has a cleaner flavour note of roasted hazelnut. Mixture iii) has an intense flavour characteristic of roasted hazelnut. Accordingly, it is possible by varying the ratio by weight between the roasted nuts A and the toasted nuts B to adjust the fineness, the characteristic note or the intensity of the roasted hazelnut flavour.

The various nuances are reflected in the respective organoleptic qualities of three hazelnut pastes prepared from each of the mixtures i), ii) and iii), each paste being prepared by passing one part by weight mixture and two parts by weight sugar through a cylinder refiner and adding 25% vegetable fats.

We claim:

1. A process for preparing a flavorant comprising:
heat-treating a first quantity of oilseeds for from 1 minute to 20 minutes at a temperature of from 220° C. to 320° C. to obtain a first quantity of heat-treated oilseeds;
heat-treating a second quantity of oilseeds for from 1 minute to 40 minutes at a temperature of from 140° C. to 180° C. to obtain a second quantity of heat-treated oilseeds;
grinding the first and second heat-treated oilseeds; and
mixing the first and second ground oilseeds.

2. A process according to claim 1 wherein the oilseeds are hazelnuts.

3. A process according to claim 2 wherein the first quantity of hazelnuts is heat-treated so that the first heat-treated quantity has L, a and b color components wherein L is from 20 to 30, a is from 0.5 to 4 and b is from 0.5 to 6.

4. A process according to claim 3 wherein the second quantity of hazelnuts is heat-treated so that the second heat-treated quantity has L, a and b color components wherein L is from 40 to 60, a is from 5 to 12 and b is from 20 to 30.

5. A process according to claim 2 or 3 or 4 wherein the ground hazelnuts are mixed in a ratio by weight of from 20:80 to 80:20.

6. A process according to claim 1 wherein the heat-treated oilseeds are coarsely ground and then finely ground.

7. A process according to claim 1 wherein the heat-treated oilseeds are first ground to grains having a size of from 0.5 mm to 2 mm and then the grains are ground to a particle size of from $20\mu$ to $40\mu$.

8. A process according to claim 1 further comprising, prior to grinding the heat-treated oilseeds, brushing the heat-treated oilseeds and then grinding the brushed oilseeds.

9. A process according to claim 1 wherein the oilseeds are selected from the group consisting of almonds, pistachio nuts, peanuts, pine nuts, walnuts, para nuts and cashew nuts.

10. A product obtained by the process of claim 1.

11. A product obtained by the process of claim 3.

12. A product obtained by the process of claim 4.

13. A composition comprising a mixture of a first quantity of ground hazelnut particles having L, a and b color components wherein L is from 20 to 30, a is from 0.5 to 4 and b is from 0.5 to 6, and a second quantity of ground hazelnut particles having L, a and b color components wherein L is from 40 to 60, a is from 5 to 12 and b is from 20 to 30.

14. A composition according to claim 13 wherein the first and second quantities of hazelnut particles are in a ratio by weight of from 20:80 to 80:20.

* * * * *